US007987261B2

United States Patent
Gamble (10) Patent No.: US 7,987,261 B2
(45) Date of Patent: Jul. 26, 2011

(54) TRAFFIC PREDICTOR FOR NETWORK-ACCESSIBLE INFORMATION MODULES

(75) Inventor: Nathan E. Gamble, Redwood Shores, CA (US)

(73) Assignee: Yahoo! Inc., Sunnyvale, CA (US)

( * ) Notice: Subject to any disclaimer, the term of this patent is extended or adjusted under 35 U.S.C. 154(b) by 488 days.

(21) Appl. No.: 11/831,075

(22) Filed: Jul. 31, 2007

(65) Prior Publication Data

US 2009/0037421 A1    Feb. 5, 2009

(51) Int. Cl.
*G06F 15/173*    (2006.01)
(52) U.S. Cl. .......................... 709/224; 709/223; 709/226
(58) Field of Classification Search .................. 709/223, 709/224, 226
See application file for complete search history.

(56) References Cited

U.S. PATENT DOCUMENTS

| | | | |
|---|---|---|---|
| 6,801,501 B1* | 10/2004 | Knightly et al. | 370/233 |
| 7,080,030 B2 | 7/2006 | Eglen et al. | |
| 7,146,416 B1 | 12/2006 | Yoo et al. | |
| 7,543,059 B2* | 6/2009 | Johnson et al. | 709/225 |
| 2002/0165955 A1* | 11/2002 | Johnson et al. | 709/224 |
| 2003/0171990 A1 | 9/2003 | Rao et al. | |
| 2004/0230546 A1* | 11/2004 | Rogers | 706/47 |
| 2006/0136586 A1* | 6/2006 | Johnson et al. | 709/224 |
| 2009/0006192 A1* | 1/2009 | Martinez et al. | 705/14 |
| 2009/0037412 A1* | 2/2009 | Bard et al. | 707/5 |

FOREIGN PATENT DOCUMENTS

| | | |
|---|---|---|
| KR | 1020050077241 | 2/2004 |
| KR | 1020050098421 | 4/2004 |
| KR | 1020060066861 | 12/2004 |

OTHER PUBLICATIONS

PCT/US2008/071173, International Search Report, Feb. 19, 2009.
U.S. Appl. No. 11/150,320, filed Nov. 15, 2006, Martinez, et al.

* cited by examiner

*Primary Examiner* — Mohamed Wasel
(74) *Attorney, Agent, or Firm* — Martine Penilla & Gencarella, LLP (57) ABSTRACT

Methods, apparatuses and systems directed to predicting the performance of an information package or module presented on a network addressable resource, such as a web page. A particular implementation relies on regression models that utilize statistical measures of user interest in terms, concepts and other subject matter as revealed in on-line search activity of a pool of users. A model receives as inputs a plurality of attribute values corresponding to an information package or module (including one or more statistical measures of interest) and outputs an estimated click-thru rate.

19 Claims, 4 Drawing Sheets

Fig. 4 ated, into front pages or other site pages that feature web
TRAFFIC PREDICTOR FOR NETWORK-ACCESSIBLE INFORMATION MODULES

TECHNICAL FIELD

The present disclosure generally relates to estimating the anticipated traffic load and/or click-thru rate associated with information, packages or modules accessible over computer networks.

BACKGROUND

Figure 3:
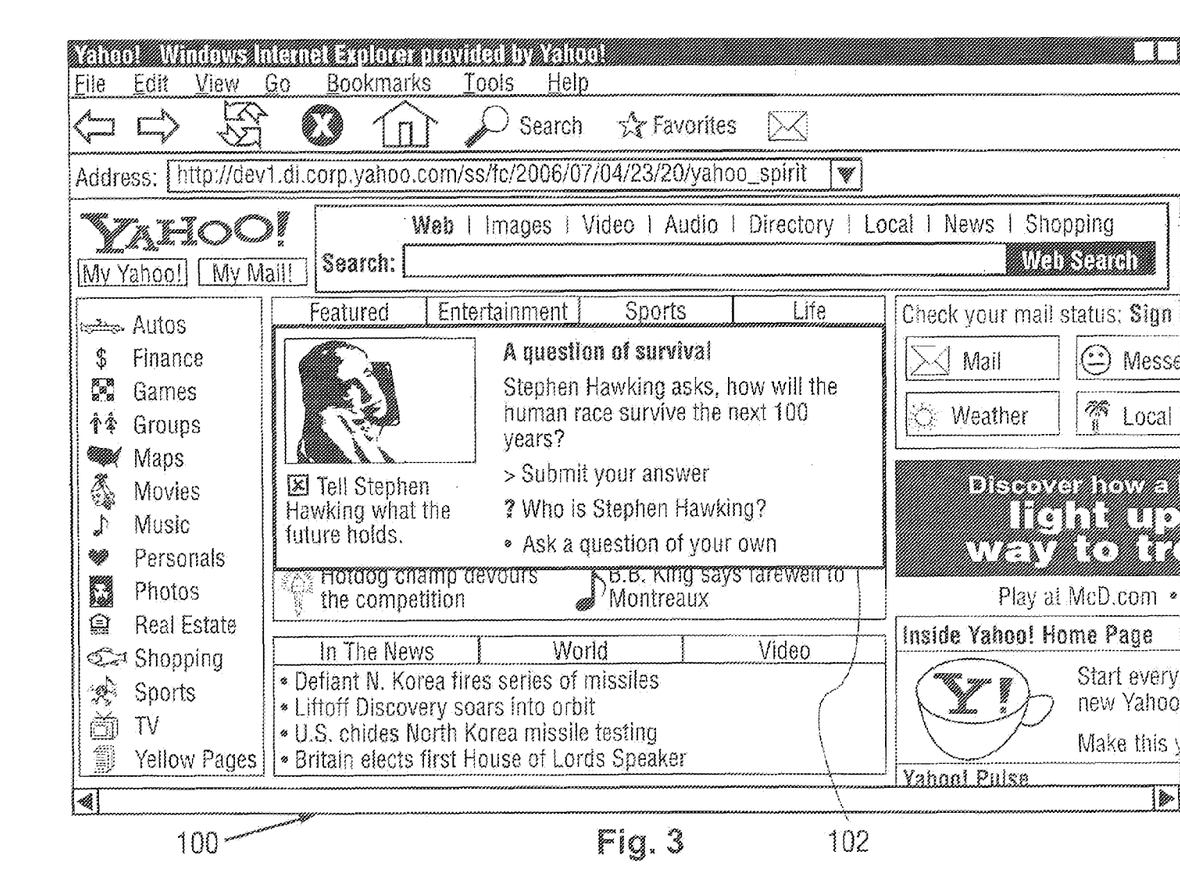
FIG. 3 illustrates an example web page and information package or module.

Interactive systems connected wide area networks, such as the Internet, have steadily evolved into vibrant mediums for social interaction and information distribution. Informational web sites, such as www.yahoo.com published by Yahoo!, Inc. of Sunnyvale, Calif., often feature or preview available content on so-called front pages. For example, to market its Yahoo! Answers service, Yahoo! often features questions and answers from celebrities or other notables within the product on the Yahoo! Front Page and throughout the Yahoo! Network. As FIG. 3 illustrates, such information packages or modules may include a headline link that links to additional content, tease copy, a photograph or other image, sub-links, and/or thumbnails. Activation of one or more of the elements in the information package . . . so called "click-thrus"—may link to a web page or other resource.

With many web sites that have high volume, it is often important to ensure that appropriate computing resources are allocated to various network applications, such as a finance or sports site or section of a site. Information packages incorporated, into front pages or other site pages that feature web properties or resources may significantly impact the network traffic involving the featured, item(s). Failure to allocate sufficient resources may cause service disruption or degradation.

DESCRIPTION OF PREFERRED EMBODIMENT(S)

A. Overview

Particular embodiments of the present invention provide methods, apparatuses and systems directed to predicting the performance of an information package or module presented on a network addressable resource, such as a web page. The present invention, in some particular implementations, relies on regression models that utilize statistical measures of user interest in terms, concepts and other subject matter as revealed in on-line search activity of a pool of users. In a particular implementation, the present invention provides a model that receives as inputs a plurality of attribute values corresponding to an information package or module (including one or more statistical measures of interest) and outputs an estimated click-thru rate.

In a particular implementation, the present invention provides a mechanism to predict one or more attributes of clickstream activity associated with an information package or module typically featured on a front page or other information page. In some implementations, the present invention allows for a prediction of the expected click-thru rate or number of click-thru associated with a featured information package or module. A click-thru is an activation of a link or other control associated with the information package; generally, clicking on a link will cause a remote server to return a page or other resource including more information relating to the topic(s) previewed in the information package.

This prediction information can be used in a number of ways. For example, the predicted clickstream activity can be used in connection with server resource allocation decisions regarding content relating to the information package, where the content is directly or indirectly linked, to the information package. The expected click-thru rate can be used, for instance, to ensure that sufficient server resources are provisioned for the anticipated load created by user clicks on the information package. In addition, embodiments of the invention can be used to facilitate optimization of the information package or module relative to anticipated click-thrus. For example, the present invention could be used as a tool to assist an advertiser to configure and optimize an advertisement (e.g., banner advertisement, text ad, sponsored search ad, etc.) for use in connection with an informational, product, or entertainment web site. The present invention can also be used as a tool to assist an on-line news editor to configure an information package featuring a news article.

In the following description, specific details are set forth in order to provide a thorough understanding of particular implementations of the present invention. Other implementations of the invention may be practiced without some or all of specific details set forth below. In some instances, well known structures and/or processes have not been described in detail so that the present invention is not unnecessarily obscured.

A.1. Example Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

Figure 1:
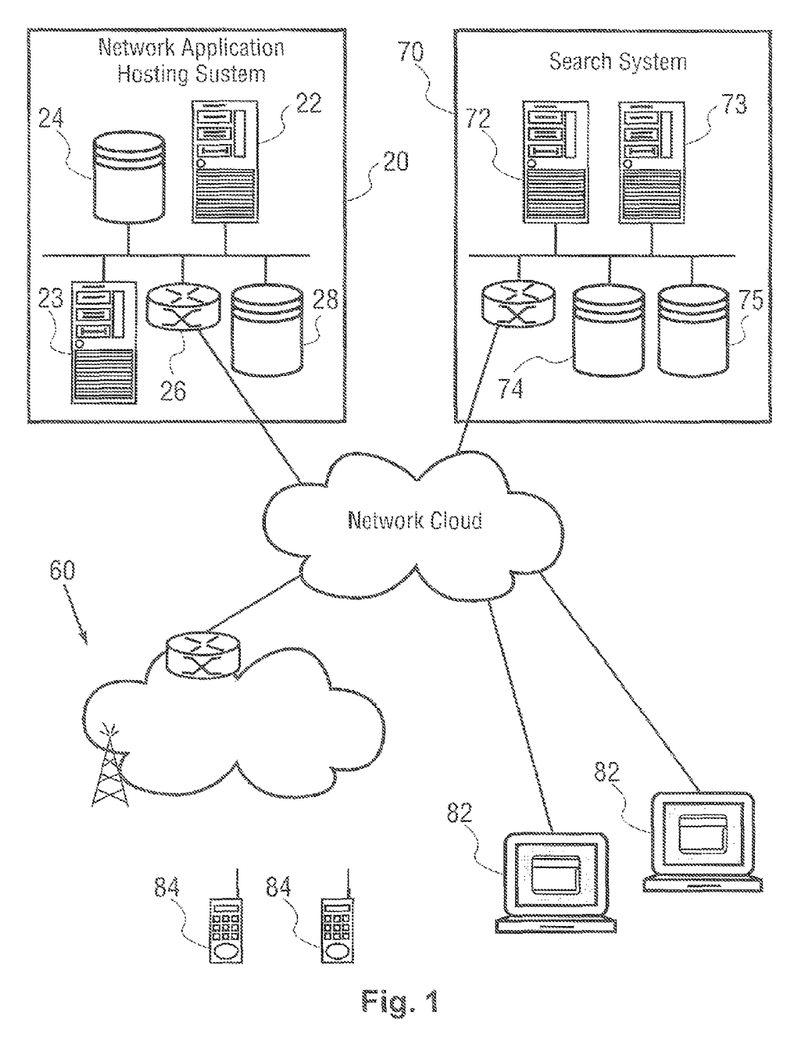
FIG. 1 is a schematic diagram that illustrates an example network environment in which particular implementations of the invention may operate.

As FIG. 1 illustrates, a particular implementation of the invention can operate in a network environment comprising network application hosting site 20 and search system 70. Although FIG. 1 illustrates the foregoing systems as separate systems, the functionality represented by each system may be combined into other systems. Furthermore, the functionality represented by each depicted system may be further separated. Still further, implementations of the invention may operate in network environments that include multiples of one or more of the individual systems and sites disclosed herein. In addition, other implementations may operate in network environments where one or more of the systems described herein have been omitted. Client nodes 82, 84 are operably connected to the network environment via a network service provider or any other suitable means.

A.1.a. Network Application Hosting Site

Network application hosting site 20 is a network addressable system that hosts a network application accessible to one or more users over a computer network. The network application may be an informational web site where users request, and receive identified web pages and other content over the computer network. The network application may also be an on-line forum or blogging application where users may submit or otherwise configure content for display to other users. The network application may also be a social network application allowing users to configure and maintain personal web pages. The network application may also be a content distribution application, such as Yahoo! Music Engine®, Apple® iTunes®, podcasting servers, that displays available content, and transmits content to users.

Network application hosting site 20, in one implementation, comprises one or more physical servers 22 and 28 and content data store 24. The one or more physical servers 22, 23 are operably connected to computer network 60 via a router 26. The one or more physical servers 22 host functionality that provides a network application (e.g. a news content site, etc.) to a user. In one implementation, the functionality hosted by the one or more physical servers may include web or HTTP servers, and the like. Physical server 23 may host functionality directed to the network traffic prediction mechanisms described herein. In some implementations, the performance prediction functionality hosted on physical server 23 can be accessible to internal users or available to external users. Still further, the functionality described herein may be accessible using an HTTP interface or presented as a web service using SOAP or other suitable protocols. Content data store 24 stores content as digital content data objects. A content data object or content object, in particular implementations, is an individual item of digital information typically stored or embodied in a data file or record. Content objects may take many forms, including; text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 24 connotes a large class of data storage and management systems. In particular implementations, content, data store 24 may be implemented by any suitable physical system including components, such as database servers, mass storage media, media library systems, and the like.

Network application hosting site 20, in one implementation, provides web pages, such as front pages, that include an information package or module describing one or more attributes of a network addressable resource, such as a web page containing an article or product description, a downloadable or streaming media file, and the like. For example, network application hosting site 20 may provide a web page 100 similar to that illustrated in FIG. 3, which further shows an information package 102 featured, on the page 100. Network application hosting site 20, in one implementation, further maintains one or more server logs 28 that can be analyzed to determine the number of impressions of a page that includes an information package or module and the number of click-thrus associated with the information package or module. The number of impressions, in one particular implementation, can be defined as the number of requests, such as HTTP GET requests and other accesses, for a given web page or other network addressable resource. For example, the number of impressions for Yahoo!'s front page totals in the millions on a daily basis. HTTP or web servers can be configured to log client requests to allow for tracking of the number of impressions. Generally, web pages and other resources include hypertext links or other controls that a user can activate to retrieve additional web pages or resources. A user "clicks" on the hyperlink with a computer input device to initiate a retrieval request to retrieve the information associated with the hyperlink or control. HTTP or web servers similarly log these retrieval events which can be counted as click-thrus. This data and the attributes of the information packages associated with this data can be used to build a predictive model of the expected performance (such as click-thru rate) of information packages under development.

A.1.b. Search System

Search system 70 is a network addressable resource that provides search results responsive to queries transmitted from remote hosts. In particular implementations, search system 70 provides one or more links to content or other network resources in search result listings. Search system 70 may provide search results including links to sponsored and/or unsponsored resources. Search system 70, in some implementations, includes one or more physical servers 72, 73 and data stores 74, 75. Search system 70, in some implementations, includes at least two types of servers, where both types have HTTP, HTTPS, SSL, FTP, and/or other functionality that allows remote access over a network. A first server type may be an account management server 72. The account management server 72 operates in connection with account management data store 74. The account management data store 74 contains advertiser account information. General-purpose browsers or special-purpose client applications, running on client nodes 82, may be used to access advertiser account information stored in account management data store 74. An advertiser may, through account management server 72 and an account residing on the account management data store 74, participate in a competitive bidding process with other advertisers. An advertiser may bid on any number of search terms relevant, for example, to the content of the advertiser's web site.

A second server type may be a search engine server 73. A search engine server 73 executes one or more search engine programs that permit users, upon navigating to the search engine web server URL or sites on other web servers capable of submitting queries to the search engine server 73, to enter queries to search for network resources of interest. In a particular implementation, the search engine server 73 may generate a search result list that includes, at least in part, relevant entries obtained from and formatted by the results of a bidding process conducted in connection with the account management server 22. The search engine server 73 may generate a list of hypertext links to documents or other resources that contain information relevant to search terms entered by a user. The search engine server 73 transmits this list, in the form of a web page, to the network user, where it is displayed on a browser or other client application running on a client node 82, 84.

In particular implementations, search engine server 73 operates in connection with a search data store 74 including search listing records used to generate search results in response to user queries. In addition, search engine server 73 may also be connected to the account management server 72. One or more of the search listings, in some implementations, correspond to a search term-bid pairing and contains information to conduct the online competitive bidding process. In some implementations, each search listing comprises a search term, a web site description, a URL, a bid amount, and a title. The search term may comprise one or more keywords which may be common words in English (or any other language). Each keyword in turn comprises a character string.

The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding. The web site description may be a short textual description of the advertiser's web site and may be displayed as part of the advertiser's entry in a search result list. The search listing may also contain a title of the web site that may be displayed as the hyperlinked heading to the advertiser's entry in a search result list. The URL contains the Uniform Resource Locator address of the advertiser's web site. When the user clicks on the hyperlink provided in the advertiser's search result list entry, the URL is provided to the browser program. The browser program, in turn, accesses the advertiser's web site through a redirection mechanism discussed herein. The URL may also be displayed as part of the advertiser's entry in a search result list.

A bid amount may be a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site.

Higher bids generally receive more advantageous placement on the search result list page generated by the search engine server 73 when a search using the search term bid on by the advertiser is executed. In a particular implementation, the amount bid by an advertiser comprises a money amount that is deducted from the account of the advertiser for each time the advertiser's web site is accessed via a hyperlink on the search result list page. A user "clicks" on the hyperlink with a computer input device to initiate a retrieval request to retrieve the information associated with the advertiser's hyperlink. In some implementations, each access or "click" on a search result list hyperlink is redirected to the search engine web server 73 to associate the "click" with the account identifier for an advertiser. This redirect action, in one implementation, accesses account identification information coded into the search result link before accessing the advertiser's URL. The account identification information is recorded in the advertiser's account, along with information from the retrieval request as a retrieval request event. The information obtained through this mechanism matches an account identifier with a URL and allows for account debit records to be maintained. Beyond Pay-Per-Click schemes, other monetization schemes are possible, such as Pay-Per-Impression.

In particular implementations, the search result fists also includes non-paid or non-sponsored listings that are not placed as a result of advertiser bids and are generated by an algorithmic search engine. In one implementation, the non-paid search result listings follow, or are provided, adjacent to, the paid or sponsored advertiser listings on the search results page.

When a user accesses a search query page provided by the search engine server 73 and executes a search request, the search engine server 73, in one implementation, generates and displays a search result list where the canonicalized entry in search term field of each search listing in the search result list matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query have the same root but are not exactly the same (e.g., computing vs. computer). Alternatively a thesaurus database of synonyms may be used by the search engine server 73, so that matches may be generated for a search terra having synonyms.

Search result list entries may also show the rank value of the advertiser's search listing. The rank value is an ordinal value, preferably a number, generated and assigned to the search listing by search engine server 73. In some implementations, the rank value is assigned through a process that establishes an association between the bid amount, the rank, and the search term of a search listing. The process gathers search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. In some implementations, only the top N ranked search listings are provided in the first page of search results returned to the user.

Search system 70 also maintains one or more logs of user activity. Search system 70, for example, maintains query logs and page hit logs. As an example of a specific data collection operation, suppose that thousands of users connect to a search server and perform a search using the phrase "local weather". The search server 72 might respond to that phrase by presenting the user with a results page including links to pages relating to weather and specifically local weather (where locality might be inferred from user preferences or other methods). The search server logs the search query itself, and possibly the time of the query, in a query log, and the "clicked-thru pages from the results page in a page hits log. A page is a "clicked-thru" page when a user notes a reference to that page on the results page and selects that reference from the results page. In many HTTP systems, the effect of those actions is that the user's browser (or other HTTP client) requests the referenced page from the server indicated in the reference and the referenced server responds to the request with the referenced page. As discussed below, maintaining these statistics in a time-based format allows for time-windowed and/or trend analysis of the search log data.

To allow search system 70 to track user clicks, the search links of a results page, in one implementation, include URLs that correspond to search system 70, but also include encoded information that maps to a URL of an underlying network resource, such as an advertiser web site, a document data store, etc. Accordingly, in one implementation, search system 70 generates encoded URL identifiers for one or more URLs in a page of search results, and adds these encoded URL identifiers as a parameter to a redirection URL that identifies search system 70. For example, the encoded URL identifier may be one or more strings and be included in the following example URL: http://search.yahoo.com/_rdrct=UJASf4&SIG=11aygd. In one implementation, search system 70 stores the encoded URL identifier in association with the corresponding link for later use. After generating one or more encoded URLs for inclusion in the search results, search system 70 may transmit the results to a requesting client node.

In particular implementations, redirection generally refers to transmitting a message from a server to a client application, for example, that causes the client application to access another server or resource without intervention or action by the end-user. Redirection can be accomplished in a number of different ways. For example, in connection with HTTP, redirection messages can be implemented using refresh meta tags, such as

```
<html><head>
  <meta http-equiv="refresh" content="0; url=http://www.yahoo.com/">.
```

In addition, redirection messages can be implemented using HTTP refresh headers.

```
HTTP/1.1 200 ok
Refresh: 0; url=http://www.yahoo.com/
Content-type: text/html
Content-length: 78
Follow <a href="http://www.yahoo.com/">link</a>.
```

Redirection can also be accomplished by transmitting an HTML page including JavaScript code operative to accomplish redirection. Other suitable redirection methods can be used for other protocol environments.

As discussed in more detail below, search system 70 is operative to analyze its query and/or page hit logs to compute measures of interest in one or more of keywords, topics and/or categories. Traffic prediction server 23, as described in more detail below, may map one or more attributes of an information package to such keywords, topics and/or categories, determine a measure of interest for the one or more attributes for use in connection with a predictive model of the expected performance of the information package.

A.1.c. Client Nodes

Client node is a computer or computing device including functionality for communicating over a computer network. A client node can be a desktop computer 82, laptop computer, as well as mobile devices 84, such as cellular telephones and personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within the web pages and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

A.2. Example Protocol Environment

The networked systems described herein can communicate over the network 60 using any suitable communications protocols. For example, client nodes 82, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context, may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

A.2. Example Computing System Architectures

The client and server host systems described herein can be implemented in a wide array of computing systems and architectures. The following describes example computing architectures for didactic, rather than limiting, purposes.

Figure 4:
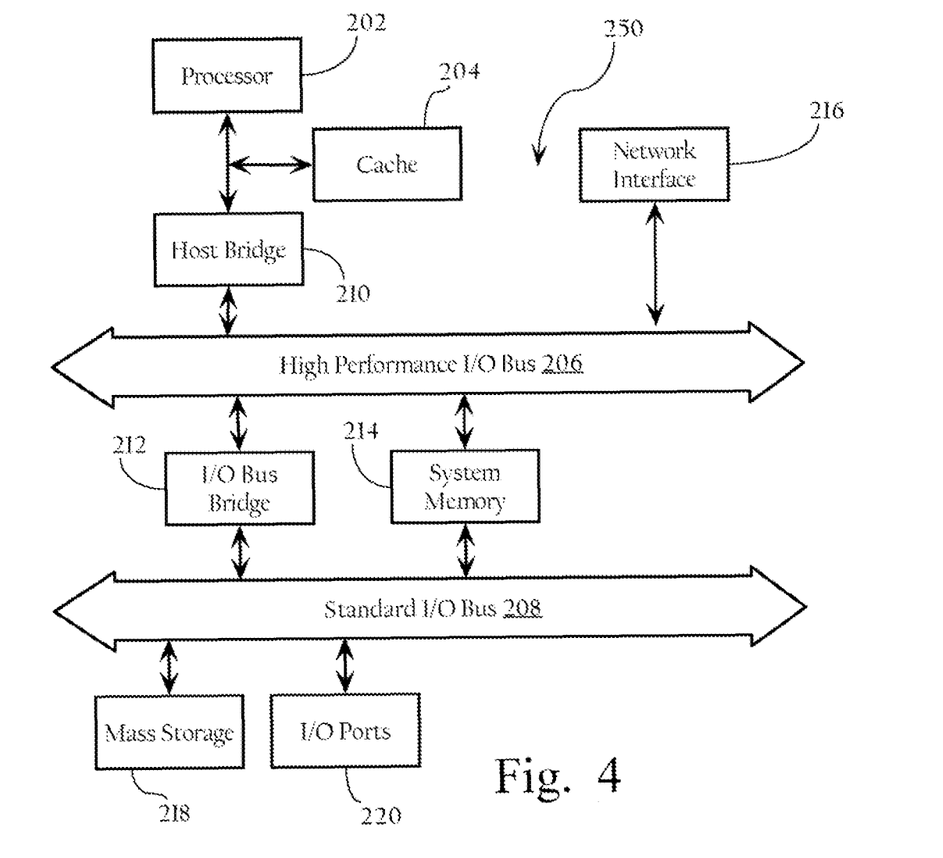
FIG. 4 is a schematic diagram illustrating an example computing system architecture that may be used to implement one or more of physical servers.

FIG. 4 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured, by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202, I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interlace between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

B. Aggregate Internet User Interest Data

The predictive models disclosed herein operate in connection with one or more sources of information capturing relatively current, aggregated information about the interest of Internet users, as well as their preferences and behavior, as revealed from logging and analysis of on-line search activity. Algorithmic search engines, such as that offered by Yahoo! Inc. (search.yahoo.com), register millions of key word search queries each day. The greater majority of Internet users regularly rely on search engines in order to locate Web sites, information and commercial items of interest. Search engine operators, therefore, because they capture millions of user queries, have access to rich stores of data regarding which subject matter is generating more or less interest at a given point in time. Query logs maintained by search engines, for example, can include one or more entries including a query string and a time stamp. Query log entries can contain additional attributes as well, such as the search segment (e.g., images, local, shopping, etc.) specified by users. Such query logs can be aggregated to yield statistics regarding a variety of information including the frequency of the query strings, one or more keywords in the query strings, the concepts or categories of the query and the like. Additionally, search engine operators capture real time information regarding those Web sites of interest to which users navigate once a listing of relevant search results are returned in response to given queries (user behavior). Thus, data generated by search engines concerning user query and navigation patterns can provide extremely probative, useful information regarding the aggregate desires and preferences of the Internet user population en large for obtaining or accessing certain types of information, including graphical or other rich digital content. Such aggregated information provides an excellent means for understanding the potential level of interest of users for different products, services and items of information and entertainment, including digital content. This aggregated information reflecting ever-shifting user preferences can be beneficially used to predict the performance of an information package presented on a web page.

In one particular embodiment, the predictive models disclosed herein makes recourse to query and other logs of algorithmic and/or sponsored search engines as a source of aggregated information reflecting user preferences and interest. In other implementations, the predictive models disclosed herein access post-processed information derived from analysis of query and/or page hit logs of algorithmic and/or paid search engines. It should be appreciated, however, that any repository of relatively current information reflecting user preferences can be used.

In one implementation, one of the data stores of Internet user behavior information are query logs of a search engine, such as search system 70. In one particular implementation, the query and page hit logs can be analyzed to determine a statistical measure of interest in a given term, topic and/or category. For example, search system 70 can implement the activity monitoring and interest scoring functionality disclosed in U.S. Pat. No. 7,146,416, which is incorporated by reference herein. Search system 70 may use this technology to compute and maintain statistical measures or scores of interest (so-called "buzz" values) in terms, topics, and/or categories. In addition, the search system 70 may also track changes or trends in buzz values. For example, a "buzz" value may represent the level of interest of a subject, such as a movie, a person, product, place, or event, cultural phenomena, etc., and change in buzz value might be indicative of a trend. The buzz value, in one particular implementation, can be calculated as the number of unique users searching for that subject anywhere on a portal site or set of portal sites, or viewing a page of content relevant to that subject anywhere on the portal site or set of portal sites. A buzz value might also be calculated without regard to whether each event that is counted is originated by a unique user.

The buzz values can be used to identify cultural trends, track interest in specific brands, measure the effectiveness of marketing campaigns, etc. For buzz events that are purchase events, the count by which a bin is incremented might be a function of purchase amount, so that purchases of larger amounts have more of an effect on a product's buzz than purchases of smaller amounts. In one particular implementation, the buzz value associated with a particular term or category is the number of users searching with that term, or viewing a page related to that term, divided by a sum of users searching, where the sum can be the sum of users searching over all subcategories in a category, sum of users searching over all terms in a category, or the sum of all users searching anywhere on the site. The latter normalization is useful to factor out time-based increases in traffic, such as weekday-weekend patterns, seasonal patterns and the like. A normalization factor might be applied to all terms being compared so that the buzz values are easily represented. For example, if there are four terms in a category, 100 total unique user hits on those four terms (25, 30, 40 and 5, respectively) out of one million total unique users, a normalization factor of 100,000 might be applied so that the buzz values are 2.5, 3, 4 and 0.5, instead of 0.000025, 0.00003, 0.00004 and 0.000005. Normalization can also be used when determining the buzz surrounding one company or product against, an index of other companies or products within a particular market segment or product category.

In some implementations, trend values can also be computed. For example, a trend, value can be computed based on the change between a buzz value for a given term, topic or category from one day to the next. Other trend values based on longer or shorter periods can also be computed. In some cases, the buzz values for a subject might be a leading indicator for electronic commerce transactions relevant to that subject. For example, the buzz for the term "widget" might rise and be followed by increased on-line purchases of widgets. Such information may be useful in the predictive models described herein.

In one implementation, traffic prediction server 23 may map a one or more attributes of an information package to a term, topic and/or category, respectively, having a statistical measure of interest, and use the mapped values in a regression model to predict, the performance of the information package relative to click-thru rates or total click-thrus. For example, in one implementation, the identity of a celebrity featured in the information package can be mapped to a topic. The buzz value of the topic, and/or the trend of the buzz value, for the topic may be used in predicting the click-thru rate for the information package.

C. Predictive Performance Model

In a particular implementation, the predictive model is a regression-based forecasting model that uses historical behavioral data about the past performance of previous information packages and traffic pattern data including impression and click data. Generally, the regression analysis involves breaking down an information package into one or more attributes and, optionally, selecting one or more attributes that are derived from the direct attributes of the information package. For example, a direct attribute of the information package may include the spokesperson featured in the information package, while a derived attribute may be the subject with which the spokesperson is most commonly associated (even though it has no relation to the subject matter of the information package). Buzz values (numeric values characterizing the level of interest of a term, subject, person, or concept as revealed by on-line search activity) for one or more of the attribute values may then be determined. The attributes, buzz values and temporal parameters are inputs to a predictive model of the performance of the information package. Other attributes can include the current bid price on a sponsored search system for one or more terms that map to various attributes of the information package.

Regression analysis examines the relation of a dependent or response variable to one or more independent variables (explanatory variables). A regression equation contains estimates of one or more unknown regression parameters or coefficients, which quantitatively link the dependent and independent variables. The parameters are estimated from given realizations of the dependent and independent variables. In one implementation, the dependent (response) variable of the regression, is click-thru rate. With an estimated click-thru rate, a tool could derive the number of anticipated clicks by multiplying click-thru rate by an expected number of impressions. Other metrics such as clicks-per-minute can also be computed. Still further, other metrics characterizing performance of an information package or module include number of page views, clicks, sessions, users, number of user conversions, purchase transactions, etc.

The regression model can be a generic model, or be specifically adapted to one or more information package types, such as Yahoo! Answers, banner advertisements, and the like. For example, in the advertisement context, the regression model could include a buzz value for general level of interest in a general product category, as well as more detailed attributes of the product. The regression model could also include a buzz index value for the pitch person or spokesperson, as well as attributes of the copy or tease. The regression model can be built based on historic data relative to one or more selected attributes including temporal attributes and buzz index values as predictors of click thru rate. The regression analysis may result in coefficients for the attribute values, as well as statistical measures of how well the model fits the historical data (e.g., R-squared and p-values). The attributes or inputs to the regression model can be fixed or determined based on a manual, heuristic process of running a sample set to determine those attributes that are statistically significant predictors of click-thru rate. In one implementation, the regression model can be constructed by starting with a set of candidate attributes and eliminating the least statistically significant attributes in an iterative process until a set of statistically significant attributes is identified and the R-squared value of the model is at or above a threshold level. In one implementation, a tool could be configured to dynamically select the statistically significant attributes from a pool of candidate attributes of the information package.

The independent (explanatory) variables of the regression can vary considerably depending on the type of information package. For an information package featuring a Yahoo! Answers segment, the independent variables may be based on one or more of gender of person identified in the information package, start time, end time, day of week, Buzz values, and subjective measures like "Is the celebrity's question aligned with the source of his/her notoriety (yes/no)?" and "Does the question inspire practical/applicable knowledge or aspirational/theoretical knowledge?" In a particular implementation, a regression model configured, for Yahoo! Answers includes the following inputs:

Start Time: When will the information package start on the Front Page?
End Time: When will package move or end rotation?
Day of Week: What day of the week will the package run?
Gender: Is the notable person featured in the package male or female?
Type: Is the notable an entertainer (i.e. in front of camera ergo "Entertainer") or not?
Asking or Answering: Is the notable asking or answering a question?
Celebrity Buzz: What is the buzz value for the notable? (e.g. "William Shatner")
TV/Media Buzz: What is the buzz value for notable's show? (e.g. "Show Me the Money)
Affinity Buzz: What is the buzz value for which he/she is best known? (e.g. "Star Trek")
Topic Buzz: What is the buzz value for the notable's topic? (e.g. "game shows")

The attribute values corresponding to gender, day of week and Boolean values may be mapped to numeric values for purposes of the regression analysis. For example, "male" may be mapped to a numeric value of 1, while "female" could may to 2. Similarly, "true" or "yes" may map to 1, while "false" or "no" may map to 2. Still further, the days of the week could map to corresponding numeric values as well.

The temporal attributes of an information package (including time of day, start time, and end time) can be used as inputs to the regression model, and can be used to determine an expected number of impressions. For example, it has been observed that different days of the week may have different overall traffic loads. In addition, the start time and end time determine the length of time the information package will be presented, which is also relevant to the number of impressions that the information package is to receive. In one implementation, the predictive tool may estimate the number of impressions based on these temporal parameters and a time table of historical traffic data that maintains the number of impressions observed, at hourly intervals over the last M (e.g., 6 weeks) for a given page (such as a front page) on which the information package will be displayed. The results for each day of the week over the span of time that the package is run can be aggregated to return an estimated number of impressions. For start and end times that do not fall on hourly boundaries, an even distribution of impressions over the hour interval can be assumed for purposes of the analysis.

As discussed above, to obtain buzz values for one or more terms, the tool may access search system 70. In one implementation, the buzz values for the last N (e.g., 7) days can be averaged. Furthermore, partial matching can be used to return the set of search terms or queries. A user may then select one of the terms and use the corresponding buzz value. Additional details follow about determining the buzz values for the Celebrity Buzz, TV/Media Buzz, Affinity Buzz, and Topic Buzz variables. For example, to obtain a celebrity buzz value, a user may enter the full name of the celebrity or notable (e.g., "Oprah Winfrey"). If partial matching is used, the search system 70 may return the following hypothetical results; Oprah=49.16; Oprah Winfrey=12.67; and Oprah Winfrey Show=2.85. In one implementation, the highest value is selected and used in the predictive model. For TV/Media Buzz, a user may enter results for a television show or current movie (e.g. "Oprah Winfrey Show"), if any, otherwise the user may enter 0 for TV/Media Buzz. For Affinity Buzz, a user may enter one or more topics or subjects for which the notable is best known (i.e., un-aided awareness); a selected topic is then mapped to a buzz value. For example, if William Shatner is the notable person featured in an information package, the general public may associate him with "Star Trek" or "Captain Kirk." In one implementation, the buzz value for the most popular affinity concept is selected. The topic buzz captures the general topic or subject of the information package. For Yahoo! Answers, it is the general topic that the notable will be addressing with his/her question or answer.

Figure 2:
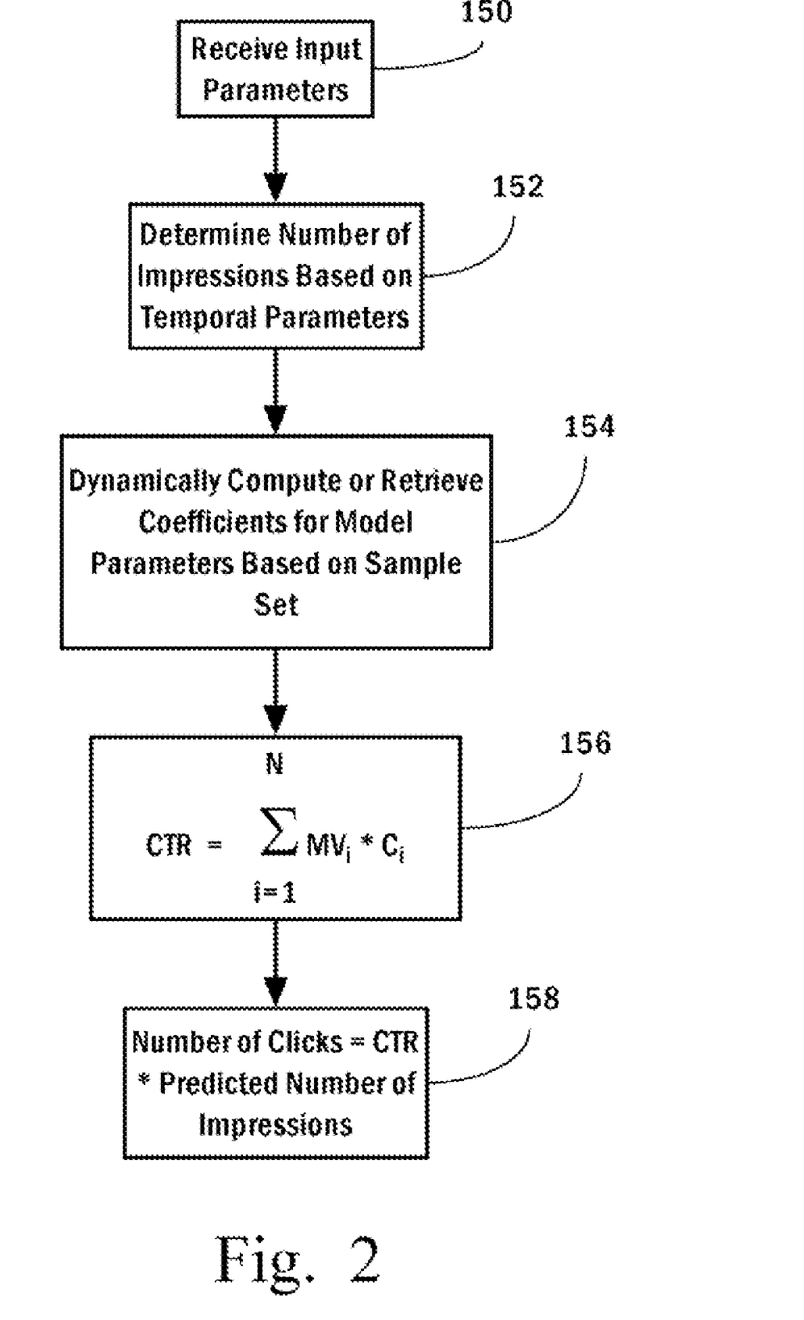
FIG. 2 is a flow chart that shows an example method directed to predicting the performance of an information package or module.

FIG. 2 illustrates a process flow, according to one possible implementation of the invention, directed, to predicting a click-thru rate and total number of clicks for an information package. In one implementation, the traffic prediction server 23 receives the input parameters for a given information package (150) and, accessing the time table information discussed above, determines the expected number of impressions (152). The traffic prediction server 23 then dynamically computes or retrieves the coefficients for the input parameters based on a sample set of historical data for past information packages (154). For example, the predictive model may allow the user to select the sample set of past information packages and associated data to be used to construct the regression model. The expected click-thru rate (CTR) is computed by multiplying the value of each input parameter (MVi) by the corresponding regression coefficient (Ci) and summing the resulting values over all (N) input parameters (156). The total number of clicks can be computed by multiplying CTR by the predicted number of impressions (158). Other metrics can also be computed, such as clicks-per-minute, peak click-thru rate and the like by consulting the time table of impression data.

The predictive model described herein can be used in a variety of manners. For example, a user may use the tool to compare forecasts for similar packages, to evaluate creative choices for editorial and advertising copy and images, and to analyze the performance of past information packages to better understand how and why an information package may have performed as it did. Additionally, a user could use the predictive forecasting tool to first look at buzz values for terms, concepts, etc. having high buzz values, and use this information to assist in construction of information packages (such as finding content or creating content related to a selected term(s), concept, etc.).

Particular implementations of the invention provide a number of new advantages for selecting, programming, and refining editorial content as well as marketing creative, internally and externally. As shown earlier, an editorial package on the Front Page of Yahoo! consists of a headline link, a photo, tease copy, and sub-links. Each of the decisions an editor makes about how to write that copy or select a picture influences the CTR of an information package. Use of the predictive forecasting tool described herein reveals that subtleties matter. The predictive tool could be used to help an editor choose language for a headline or other copy in an information package as well as to choose between photos that communicate concepts and other information about the package. As an example, assume for didactic purposes that Yahoo! Answers received a question from Queen Rania of Jordan. The headline for the package could have been written any number of ways. Instead of saying "Jordan's Queen Rania ask . . . " the headline could have read "Her Royal Highness asks . . . ." When developing the forecast for this package an editor might note that the term "queen" had a Buzz score of 7.09 while the term "royal" only had a Buzz score of 0.90 and "royalty" only had a Buzz score of 0.26. This insight can be used to favor selection of the word "queen" and its use in a prominent manner. Similar methods can be applied by editors to optimize other choices about tease copy, photos, and sublinks all which shape the tone or tenor of an information package.

Still further, editors of news or other information sites often have a multitude of stories crossing the news wire in addition to being pitched ideas from other teams. Choosing between these stories is often a matter of subjective instinct. In this case, running information packages or contemplated packages through the predictive tool could help an editor choose which story to program. For example, assume that Yahoo! Answers has the opportunity to pitch two information packages—one from Donald Hall, the new U.S. Poet Laureate, another from acclaimed author Joan Didion. Analysis of the buzz values revealed that, while Didion has greater name recognition that Donald Hall, poetry (as a topic) had even broader appeal. The methods and principles described above could also be used to optimize display or sponsored search advertising online. For example, Yahoo! TV has recently shifted its advertising strategy to make its display ads contextually relevant to audience interest. So, rather than showing users an ad that says; "Check out the new listing feature from Yahoo! TV and schedule your TiVo," the an ad might say: "Check out the listing for American Idol, then schedule your TiVo, new from Yahoo! TV." Still further, the predictive tool could be used to analyze clickstream data for different demographics to allow content to be customized for different demographic groups or other user profile groups.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method for estimating the performance of an information package, comprising operations of:
   receiving one or more values of respective attributes of an information package;
   obtaining for at least one of the one or more attributes, a buzz value characterizing the level of interest in the attribute based on analysis of online user search activity, wherein the obtaining operation further comprises:
   accessing a search system maintaining buzz values for a plurality of terms, topics or categories;
   mapping one or more of the attributes of the information package to respective terms, topics or categories; and
   estimating a future performance of the information package by providing one or more attributes and one or more buzz values as input parameters to a regression model to yield a numerical value characterizing the estimated performance of the information package, wherein the regression model is based on historical performance of a set of previous information packages relative to the one or more attributes, and provides the coefficients for the input parameters to the estimated performance of the information package and wherein each operation of the method is executed by one or more processors.

2. The method of claim 1 wherein the estimated performance comprises a click-thru rate of the information package.

3. The method of claim 2 further comprising determining, by the one or more computing devices, an expected number of clicks based on said click-thru rate and an estimated number of impressions.

4. The method of claim 3 wherein one or more of the attributes comprise temporal information characterizing the time parameters according to which the information package will be presented; and wherein the method further comprises accessing, by the one or more computing devices, a data store of page impression information to estimate a number of impressions for the information package.

5. The method of claim 1 wherein one or more of the attributes comprise temporal information characterizing the time parameters according to which the information package will be presented; and wherein the method further comprises accessing, by the one or more computing devices, a data store of page impression information to estimate a number of impressions for the information package.

6. The method of claim 1 further comprising multiplying, by the one or more computing devices, each value of the one or more attributes by the corresponding coefficient provided by the regression model to yield an adjusted value, and summing the adjusted values for each attribute to yield the expected performance of the information package.

7. The method of claim 1 further comprising constructing, by the one or more computing devices, the regression model and selecting, by the one or more computing devices, one or more attributes for analysis based on an assessment of which attributes are statistically significant predictors of the performance of information packages.

8. The method of claim 1 wherein the information package is a network accessible information package.

9. The method of claim 1 further comprising optimizing, by the one or more computing devices, one or more attributes of the information package based on the estimated performance.

10. An apparatus comprising:
    one or more network interfaces;
    a memory;
    one or more processors; and
    a performance predictor module, comprising computer-readable instructions physically stored in the memory, operable to cause the one or more processors to perform the following operations:
    receive one or more values of respective attributes of an information package;
    obtain, for at least one of the one or more attributes, a buzz value characterizing the level of interest in the attribute based on analysis of on-line user search activity, wherein this operation further includes the operations:
    access a search system maintaining buzz values for a plurality of terms, topics or categories; and
    map one or more of the attributes of the information package to respective terms, topics or categories; and
    compute an estimated future performance of the information package by applying one or more of the attributes and buzz values to a regression model, wherein the regression model is based on historical performance of a set of previous information packages relative to the one or more attributes.

11. The apparatus of claim 10 wherein the estimated performance comprises a click-thru rate of the information package.

12. The apparatus of claim 11 wherein the performance predictor module further comprises instructions operative to cause the one or more processors to determine an expected number of clicks based on the estimated click-thru rate and an estimated number of impressions.

13. The apparatus of claim 12 wherein one or more of the attributes comprise temporal information characterizing the time parameters according to which the information package will be presented; and wherein the performance predictor module further comprises instructions operative to cause the one or more processors to access a data store of page impression information to estimate a number of impressions for the information package.

14. The apparatus of claim 10 wherein one or more of the attributes comprise temporal information characterizing the time parameters according to which the information package will be presented; and wherein the performance predictor module further comprises instructions operative to cause the one or more processors to access a data store of page impression information to estimate a number of impressions for the information package.

15. The apparatus of claim 10 wherein the performance predictor module further comprises instructions operative to cause the one or more processors to multiply each value of the one or more attributes by the corresponding coefficient provided by the regression model to yield an adjusted value, and sum the adjusted values for each attribute to yield the expected performance of the information package.

16. The apparatus of claim 10 wherein the performance predictor module further comprises instructions operative to cause the one or more processors to construct the regression model and select one or more attributes for analysis based on an assessment of which attributes are statistically significant predictors of the performance of information packages.

17. The apparatus of claim 10 wherein the information package is a network accessible information package.

18. The apparatus of claim 10 wherein the performance predictor module further comprises instructions operative to cause the one or more processors to optimize one or more attributes of the information package based on the estimated performance.

19. A method comprising operations of:
defining, using a computing device, one or more values of respective attributes of an information package;
obtaining, for at least one of the one or more attributes, a buzz value characterizing the level of interest in the attribute based on analysis of on-line user search activity, wherein the obtaining operation further comprises mapping one or more of the attributes of the information package to respective terms, topics, or categories having buzz values; and
providing one or more attributes and one or more buzz values as input parameters to a regression model to yield an estimated future click-thru rate for the information package, wherein the regression model is based on historical click-thru rate performance of a set of previous information packages relative to the one or more attributes, and provides the coefficients for the input parameters to the estimated click-thru rate for the information package; and
optimizing the information package by iteratively redefining one or more values of the respective attributes of the information package and applying the redefined attribute values and corresponding buzz values to the regression model until a desired estimated future click-thru rate is achieved.

* * * * *